United States Patent
Sandoval

(10) Patent No.: US 12,254,098 B2
(45) Date of Patent: *Mar. 18, 2025

(54) EXPLOIT DETECTION VIA INDUCED EXCEPTIONS

(71) Applicant: Open Text Inc., Menlo Park, CA (US)

(72) Inventor: Andrew L. Sandoval, San Antonio, TX (US)

(73) Assignee: OPEN TEXT INC., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/479,584

(22) Filed: Oct. 2, 2023

(65) Prior Publication Data

US 2024/0028746 A1 Jan. 25, 2024

Related U.S. Application Data

(63) Continuation of application No. 17/516,286, filed on Nov. 1, 2021, now Pat. No. 11,809,573, which is a continuation of application No. 16/266,330, filed on Feb. 4, 2019, now Pat. No. 11,170,112.

(60) Provisional application No. 62/696,116, filed on Jul. 10, 2018.

(51) Int. Cl.
*G06F 21/00* (2013.01)
*G06F 21/55* (2013.01)
*G06F 21/57* (2013.01)

(52) U.S. Cl.
CPC .......... *G06F 21/577* (2013.01); *G06F 21/554* (2013.01); *G06F 2221/034* (2013.01)

(58) Field of Classification Search
CPC ................. G06F 21/577; G06F 21/554; G06F 2221/034; G06F 21/566
See application file for complete search history.

(56) References Cited

U.S. PATENT DOCUMENTS

2012/0254994 A1* 10/2012 Sallam ................ G06F 21/554
726/22
2016/0191550 A1* 6/2016 Ismael ................ H04L 63/1433
726/1

* cited by examiner

Primary Examiner — William A Corum, Jr.
(74) Attorney, Agent, or Firm — Sprinkle IP Law Group

(57) ABSTRACT

Examples of the present disclosure describe systems and methods for exploit detection via induced exceptions. One embodiment of a method can include generating an inspection point, the inspection point causing an exception when a set of software instructions encounters the inspection point during an execution of the set of software instructions by a processor, registering an exception handler to handle the exception associated with by the inspection point; receiving, in response to the set of software instructions encountering the inspection point, an indication of an exception, accessing a context record associated with the execution of the set of software instructions, evaluating the context record to determine if an exploit is present using the first reputation information, and based on a determination that an exploit is present, performing a corrective action for the exploit.

18 Claims, 4 Drawing Sheets

EXPLOIT DETECTION VIA INDUCED EXCEPTIONS

CROSS-REFERENCE TO RELATED APPLICATION

This application is a continuation of, and claims a benefit of priority under 35 U.S.C. § 120 from U.S. patent application Ser. No. 17/516,286, filed Nov. 1, 2021, entitled "EXPLOIT DETECTION VIA INDUCED EXCEPTIONS," issued as U.S. Pat. No. 11,809,573, which claims a benefit of priority under 35 U.S.C. § 120 from U.S. patent application Ser. No. 16/266,330, filed Feb. 4, 2019, entitled "EXPLOIT DETECTION VIA INDUCED EXCEPTIONS," issued as U.S. Pat. No. 11,170,112, which claims a benefit of priority under 35 U.S.C. § 119 (e) from U.S. Provisional Application No. U.S. Provisional Application No. 62/696,116, entitled "EXPLOIT DETECTION VIA INDUCED EXCEPTIONS," filed on Jul. 10, 2018, the entire contents of all are hereby incorporated by reference in their entirety for all purposes.

BACKGROUND

In examples, stack manipulation exploits are used to execute malicious software instructions using a combination of benign software instructions. However, certain such exploits are difficult to identify, as traditional identification techniques may overwrite information that would otherwise be useable to identify the exploits.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

Examples of the present disclosure describe systems and methods for exploit detection via induced exceptions. In an example, one or more inspection points are generated by a threat processor. For instance, an inspection point may be generated by altering aspects of one or more APIs, setting a process or hardware breakpoint, and/or modifying permissions of one or more memory pages, among other examples. Accordingly, the threat processor may register one or more exception handlers corresponding to the generated inspection points, such that exceptions generated during software execution resulting from the generated inspection points may be caught and processed.

For instance, when the threat processor catches an exception, a context record associated with software execution may be processed by the threat processor to determine whether a potential exploit is identified. In some examples, if a potential exploit is identified, an indication or prompt may be presented to a user, an entry may be generated in a log, software execution may be terminated, execution parameters may be adjusted, and/or data may be gathered for contemporaneous or later analysis, among other corrective actions. As a result of using inspection points to induce exceptions, the execution state of the set of software instructions is preserved, such that the call stack, registers, and other context information is available for analysis by the threat processor.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

Figure 1:
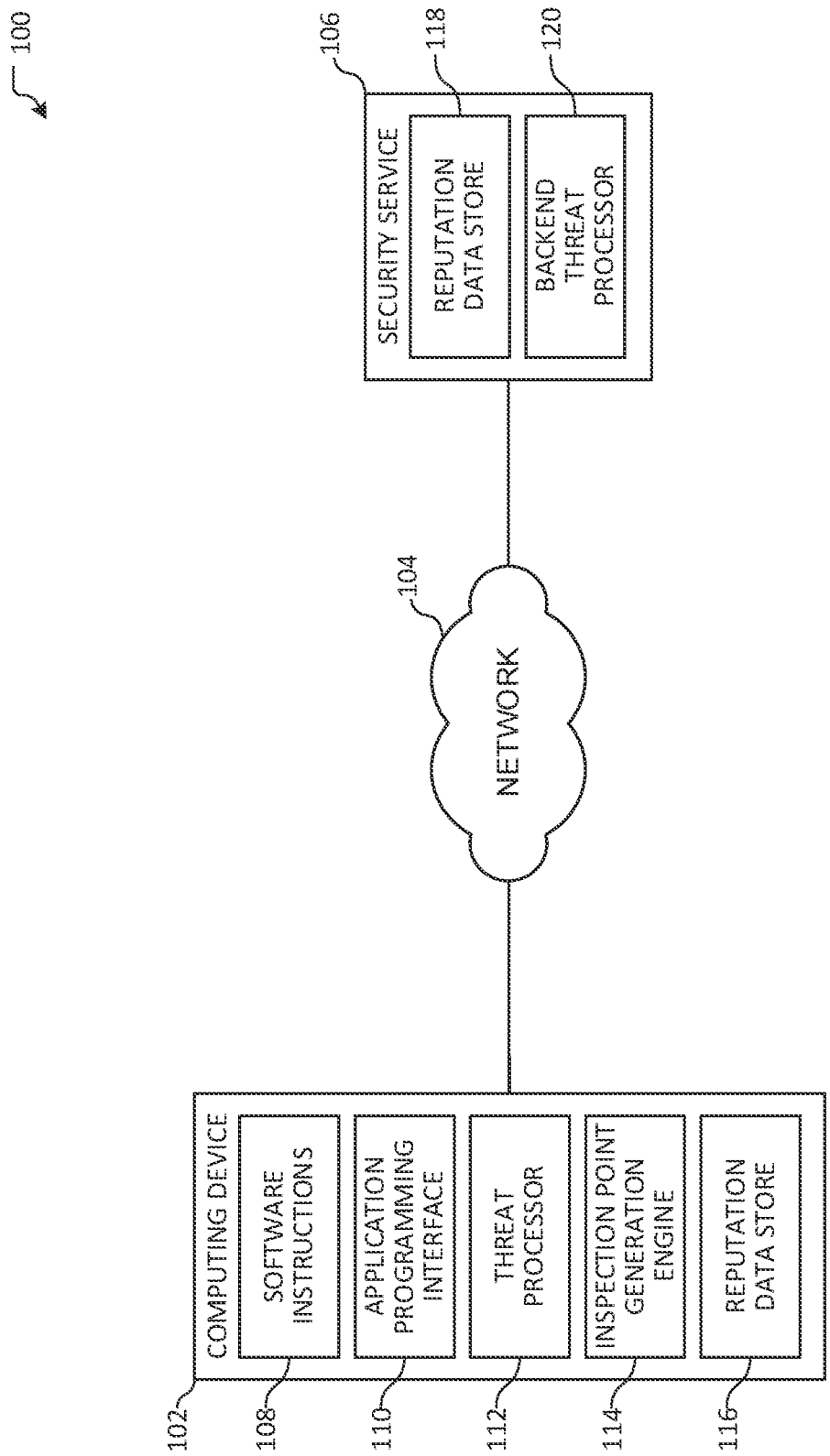
FIG. 1 illustrates an overview of an example system for exploit detection via induced exceptions.

Various aspects of the disclosure are described more fully below with reference to the accompanying drawings, which form a part hereof, and which show specific example aspects. However, different aspects of the disclosure may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems or devices. Accordingly, aspects may take the form of a hardware implementation, an entirely software implementation or an implementation combining software and hardware aspects. The following detailed description is, therefore, not to be taken in a limiting sense.

In an example, a computing device may comprise or make available one or more application programming interfaces (APIs), which may be used when executing a set of software instructions. In some examples, one or more hooks (e.g., a jump or call to a different set of software instructions, etc.) are generated on such APIs in order to enable a threat processor to evaluate a set of software instructions calling the API. Accordingly, the threat processor may determine whether the set of software instructions is benign or malicious. As an example, the threat processor may evaluate a call stack associated with the set of software instructions to identify the presence of a stack manipulation exploit. However, given that such hooks affect the control flow of the set of software instructions, certain useful information may be overwritten, such that the information may not be available to the threat processor when determining whether the set of software instructions is potentially malicious.

Accordingly, the present disclosure provides systems and methods for exploit detection via induced exceptions. In an example, one or more inspection points are generated by a threat processor. As used herein, generating an inspection point comprises any of a variety of techniques that cause an exception to be generated during execution of a set of software instructions. For example, an API may be modified to incorporate an inspection point. A threat processor may register an exception handler, such that the threat processor catches the exception resulting from the inspection point. As a result, when a set of software instructions calls the API for which the inspection point was generated, execution of the set of software instructions is suspended, thereby enabling the threat processor to evaluate the execution and determine whether stack manipulation is present. In some examples, if a potential threat is identified, an indication or prompt may be presented to a user, an entry may be generated in a log, software execution may be terminated, execution parameters may be adjusted, and/or data may be gathered for contemporaneous or later analysis, among other corrective actions.

As compared to hooking techniques, inducing an exception via an inspection point ensures that the execution state of the set of software instructions is preserved, such that the call stack, registers, and other context information is available for analysis by the threat processor. While, in some instances, it may be possible to generate a hook that preserves such information, generating such a hook is nontrivial and is typically case-specific. Accordingly, it may not be possible to generalize such a hooking technique across different APIs and/or system architectures. By contrast, generating an inspection point to induce an exception is easier to implement and more readily generalizable while still preserving the execution state of a set of software instructions.

As an example, a computing device may be any of a variety of devices, including, but not limited to, a mobile computing device, a tablet computing device, a desktop or laptop computing device, an Internet of Things (IoT) computing device, a server computing device, or a distributed computing device (e.g., which may be comprised of a plurality of computing devices). An API provided by or made available by the computing device may enable a set of software instructions to engage in file system access or searching, network communication, process management, memory management, or communication with a specific hardware component (e.g., device drivers, sensor data access, etc.), among other functionality. While the term API is used, it will be appreciated that an API may comprise any of a wide variety of software interfaces, commands, libraries, or services, among other examples, useable by a set of software instructions when executed by a computing device. In examples, at least some of APIs on which hooks are generated may be those determined to enable bootstrapping of potentially malicious behavior.

As used herein, "software," "software instructions," and a "set of software instructions" may be used interchangeably. Example software may include applications, plugins, scripts, modules, drivers, and/or web applications, among other examples. In some examples, software may be pre-compiled, compiled at runtime, or interpreted at runtime. In another example, software may execute in kernel mode, user mode, or a combination thereof.

In some examples, one or more inspection points are generated by a threat processor in order to inspect execution of a set of software instructions at any of a variety of times. For example, the threat processor may alter an API to incorporate an instruction that will generate an exception, including, but not limited to, a privileged instruction, a breakpoint instruction, or an invalid instruction. In some instances, the API may include an additional instruction that may be used as an index number or other identifier, such that the threat processor may determine which inspection point was reached and/or whether the inspection point was placed by the threat processor, among other examples. As another example, the threat processor may set a process or hardware breakpoint that will generate an exception when reached. In other examples, the threat processor may remove execute, read, and/or write access to a page of memory, such that an exception is thrown when the set of software instructions access the page of memory. While example inspection points are described, it will be appreciated that any of a variety of other techniques may be used to induce an exception when a set of software instructions are executed.

In order to receive an indication that an inspection point has been reached, the threat processor registers one or more exception handlers according to various types of inspection points. Thus, once an exception is generated as a result of executing a set of software instructions, the threat processor receives an indication of the exception. In an example, a context record associated with the software execution is accessed and evaluated, wherein the context record comprises a recorded state of register values, including the register pointing to the call stack, associated with the execution at the time the exception occurred, among other information. The context record may be used to determine the address of the call stack (e.g., based on the stack pointer register), as well as to evaluate memory associated with specific registers and/or the Instruction Pointer. For example, code in such memory may be decompiled to evaluate at least a part of the instructions associated with software execution. Accordingly, as discussed above, the threat processor is able to access a preserved state of the software execution, whereas hooking techniques may overwrite at least some of the information available in the context record and preserved on the call stack.

The threat processor evaluates the context record to determine whether a potential threat exists. As an example, the threat processor may evaluate one or more "slots" in a call stack. For instance, a slot preceding the stack pointer (e.g., four bytes prior to the stack pointer on a 32-bit system, etc.) may hold a target function address (e.g., the function from which the inspection point was encountered), while the next preceding slot (e.g., eight bytes prior to the stack pointer on a 32-bit system, etc.) may be evaluated to determine whether it contains a pointer to a return oriented programming (ROP) gadget. In such instances, it may be determined that ROP was used to arrive at the inspection point, based at least in part on the presence of the target function address and/or the pointer to the ROP gadget on the call stack. By contrast, when ROP is not present, such slots may not precede the stack pointer, given that, during normal execution, the return address is pushed onto the stack and execution control is passed to the target function, such that a target function address and/or a ROP gadget pointer are not on the stack.

In another example, the return address is evaluated to determine whether it points to stack cleanup code that does not match or is dissimilar to what would otherwise be expected for the target function, especially if the code just prior to the return address contains a CALL instruction through a register that would normally never point to the target instruction. Such an evaluation may be used to identify a stack pivot exploit, among other examples. In some examples, the threat processor alternatively or additionally evaluates one or more registers of the context record. While example stack locations and registers are described herein, it will be appreciated any of a variety of other stack locations, registers, and other information from a context record may be evaluated in other examples. Accordingly, it is possible to determine whether the target function was entered by means of ROP and/or identify stack pivot exploits, among other exploits.

If it is determined that a potential threat exists, any of a variety of corrective actions may be performed. As an example, an indication or prompt may be generated and presented (e.g., to a user, a system administrator, etc.), which may comprise a display of information associated with the potential threat (e.g., a threat type, a set of software instructions associated with the potential threat, education materials, etc.) and/or one or more suggested actions. In some examples, a selection of a suggested action may be received by the generated prompt, such that the suggested action may be performed. In another example, an entry may be generated in a log and/or an indication may be provided to another component. In other examples, a corrective action may be taken automatically (e.g., terminating execution or adjusting execution parameters, access to one or more APIs, or access to memory, etc.) and/or data may be gathered for contemporaneous or later analysis. For example, if a memory management API is called to allocate executable memory, an example of adjusting an execution parameter may comprise modifying the attributes of the allocated memory to remove the executable attribute. Other execution parameters that may be adjusted include, but are not limited to, file permissions, user privileges, network firewall settings, and/or access or privileges associated with an API. While example actions are described herein, it will be appreciated that other actions may alternatively or additionally be performed.

FIG. 1 illustrates an overview of an example system 100 for exploit detection via induced exceptions. As illustrated, system 100 is comprised of computing device 102, network 104, and security service 106. In an example, computing device 102 and security service 106 may communicate by way of network 104. As an example, computing devices 102 and security service 106 may communicate using wired and/or wireless connections to network 104. While system 100 is illustrated as having one computing device 102, one network 104, and one security service 106, it will be appreciated that other examples may comprise alternate quantities of such elements.

Computing device 102 may be any of a variety of devices, including, but not limited to, a mobile computing device, a tablet computing device, a desktop or laptop computing device, an IoT computing device, a server computing device, or a distributed computing device. Computing device 102 is illustrated as comprising software instructions 108, application programming interface (API) 110, threat processor 112, inspection point generation engine 114, and reputation data store 116. In some examples, computing device 102 may form at least a part of an execution environment in which an operating system (OS) and/or other software may execute.

For example, software instructions 108 may execute on computing device 102. Software instructions 108 may be an application, a plugin, a script, a module, a driver, and/or a web application, among other examples. In some examples, software instructions 108 may be pre-compiled, compiled at runtime, or interpreted at runtime. In another example, software instructions 108 may execute in kernel mode, user mode, or a combination thereof.

Software instructions 108 may call one or more APIs that are available in the execution environment of computing device 102. For example, software instructions 108 may call API 110. In some examples, API 110 may enable software instructions 108 to engage in file system access or searching, network communication, process management, memory management, or communication with a specific hardware component (e.g., device drivers, sensor data access, etc.), among other functionality. In examples, API 110 may be provided by an OS of computing device 102. While examples are discussed herein with respect to API 110, it will be appreciated that, in other examples, API 110 may comprise any of a wide variety of software interfaces, commands, libraries, or services, among others, useable by software instructions 108 when executed by computing device 102. In examples, at least some of APIs on which hooks are generated may be those determined to enable bootstrapping of potentially malicious behavior.

As illustrated, computing device 102 further comprises threat processor 112. In an example, threat processor 112 may perform aspects disclosed herein in order to provide exploit detection, exploit prevention, and/or exploit mitigation, among other functionalities. In some examples, threat processor 112 may register one or more exception handlers so as to inspect a set of software instructions at any of a variety of points during software execution to determine whether the set of software instructions is malicious or potentially malicious. In some examples, one or more actions may be performed based on the determination, such as generating an indication or prompt for presentation to a user, generating a log entry, terminating execution, and/or gathering data for contemporaneous or later analysis, among other examples. In examples, threat processor 112 may generate one or more inspection points according to aspects described herein using inspection point generation engine 114.

Inspection point generation engine 114 may generate one or more inspection points so as to cause exceptions to be generated during software execution. For example, inspection point generation engine 114 may alter API 110 to incorporate an instruction that will generate an exception, including, but not limited to, a privileged instruction, a breakpoint instruction, or an invalid instruction. In some instances, API 110 may further be altered to include an additional instruction that may be used as an index number or other identifier, such that threat processor 112 may determine which inspection point was reached and/or whether the inspection point was placed by inspection point generation engine 114, among other examples. As another example, inspection point generation engine 114 may set a process or hardware breakpoint that will generate an exception when reached. In other examples, inspection point generation engine 114 may remove execute, read, and/or write access to a page of memory, such that an exception is thrown when software instructions 108 accesses the page of memory. While example inspection points are described, it will be appreciated that any of a variety of other techniques may be used to induce an exception when a set of software instructions are executed.

In examples, threat processor 112 evaluates a context record associated with the execution of software instructions 108 when an exception is generated as a result of reaching an inspection point generated by inspection point generation engine 114 (e.g., calling API 110, attempting to execute memory that was made read-only, etc.). As an example, evaluating the context record may comprise evaluating one or more "slots" in a call stack, a return address of the call stack, and/or one or more registers, as described herein. While example evaluations are described, it will be appreciated that any of a variety of other stack locations, registers, and other information from a context record may be evaluated. In an example, aspects of the evaluation may be cached as a cache entry, such that a later intercept point having a similar context record may be evaluated based at least in part on the cached evaluation, which may thereby reduce at least a part of the processing associated with the evaluation.

Reputation data store 116 of computing device 102 may comprise reputation information, which may be used by threat processor 112 when evaluating a context record associated with software execution. In an example, reputation information may relate to a set of software instructions (e.g., software instructions 108). As another example, reputation information may comprise a threat name, a threat description, a severity level, and/or information relating to one or more corrective actions, among other information. In some examples, reputation information associated with a set of software instructions stored by reputation data store 116 may be indexed based on an identifier.

Example identifiers include, but are not limited to, a hash, a fingerprint, a signature, or a globally unique identifier. In some examples, at least a part of the reputation information stored by reputation data store 116 may be generated locally and/or generated remotely (e.g., by security service 106). In some examples, reputation information may be retrieved from reputation data store 118 and cached by reputation data store 116. In other examples, reputation data store 116 may store one or more whitelists and/or blacklists, which may comprise indications (e.g., as may be received from a user, a system administrator, etc.) of software that is benign or malicious, among other indications. As a result of such indications, one or more actions may be performed automatically when an inspection point is reached by a set of software instructions. For example, execution may be permitted to continue without requesting user input or execution may be automatically terminated, among other actions.

System 100 also comprises security service 106. In an example, security service 106 may be a service for providing computer security for one or more computing devices (e.g., computing device 102). It will be appreciated that while security service 106 is illustrated as comprising elements 118-120, fewer, additional, or alternative elements may be used, or security service 106 may be provided as part of a distributed computing device or a cloud-computing system. In some examples, various aspects described above with respect to computing device 102 may additionally or alternatively be performed by security service 106. As illustrated, security service 106 further comprises reputation data store 118 and backend threat processor 120. In some examples, threat processor 112 may be provided by and/or communicate with security service 106 in order to provide computer security to computing device 102.

In an example, reputation data store 118 may comprise reputation information according to aspects disclosed herein. In some examples, backend threat processor 120 may receive a request from threat processor 112 for reputation information associated with a set of software instructions and/or a context record, such that backend threat processor 120 may access reputation data store 118 to provide reputation information in response. In some examples, the request may comprise an identifier as described above, which may be used to identify relevant reputation information from reputation data store 118. In some examples, entries in a whitelist and/or blacklist stored by a computing device (e.g., reputation data store 116 on computing device 102) may be aggregated by backend threat processor 120 and stored by reputation data store 118, thereby generating crowd-sourced reputation information.

As described above, a corrective action performed by threat processor 112 may comprise gathering data associated with the execution of software instructions 108. In examples, the data may be gathered when software instructions 108 are determined to be potentially malicious or when threat processor 112 is unable to determine whether software instructions 108 are benign, among other instances. The gathered data may comprise a context record, a memory dump, a stack trace, a crash dump, and/or one or more files associated with software instructions 108, among other data. In some examples, a user may opt-in to such data gathering. In examples, threat processor 112 may evaluate the gathered data. In other examples, threat processor 112 may provide at least a part of the gathered data to backend threat processor 120, such that security service 106 may evaluate the gathered data. In another example, at least a part of the evaluation may be performed by both threat processor 112 and backend threat processor 120.

The gathered data may be evaluated to generate and/or update reputation information, which may be stored by reputation data store 116 and/or reputation data store 118. In some examples, the evaluation may comprise executing at least a part of the gathered data in a sandbox, virtual machine, or other environment. In other examples, the evaluation may comprise evaluating the gathered data based on heuristics and/or any of a variety of machine learning algorithms. Accordingly, the gathered data may enable security service 106, threat processor 112, and/or backend threat processor 120 to provide protection against previously unknown or unconfirmed threats. While example evaluation techniques and gathered data are described herein, it will be appreciated that other techniques and data may be used without departing from the spirit of this disclosure.

Figure 2:
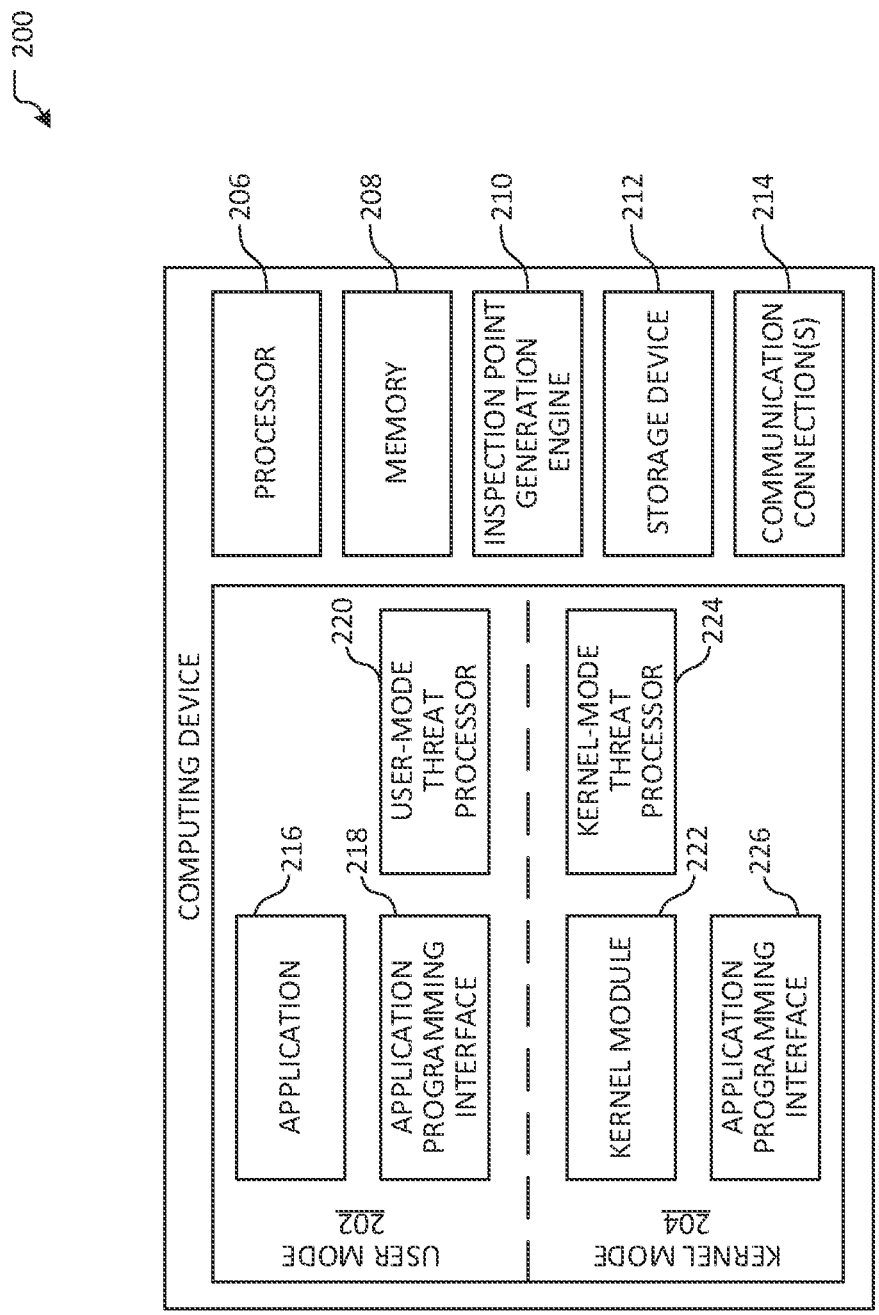
FIG. 2 illustrates an overview of an example computing device with which aspects of exploit detection via induced exceptions may be performed.

FIG. 2 illustrates an overview of an example computing device 200 with which aspects of exploit detection via induced exceptions may be performed. In an example, computing device 200 may be any of a variety of devices, including, but not limited to, a mobile computing device, a tablet computing device, a desktop or laptop computing device, an IoT computing device, a server computing device, or a distributed computing device. In some examples, computing device 200 may form at least a part of an execution environment in which an OS (e.g., which may comprise kernel module 222) and/or other software (e.g., application 216) may execute.

As illustrated, computing device 200 is comprised of user mode 202, kernel mode 204, processor 206, memory 208, inspection point generation engine 210, storage device 212, and communication connections(s) 214. In some examples, processor 206, memory 208, storage device 212, and communication connection(s) 214 may be usable by software executed by computing device 200. In some examples, one or more APIs (e.g., API 218 and/or API 226) may be useable by software executed by computing device 200 to access, interface with, and/or control aspects of computing device 200 (e.g., thread creation or deletion at processor 206, memory allocation or manipulation at memory 208, file search or access at storage device 212, network communication via communication connection(s) 214, etc.).

Computing device 200 is illustrated as comprising user mode 202 and kernel mode 204. In examples, certain system-level functionality (e.g., which may be accessible via API 226) may be restricted to software (e.g., kernel module 222) operating in kernel mode 204, while other software (e.g., application 216) may instead have access to functionality available in user mode 202 (e.g., via API 218). Such a division between user mode 202 and kernel mode 204 may provide various security benefits (e.g., decreased exploitability of software bugs, improved handling of user permissions, etc.) and may ensure system-level functionality is not easily accessed by a set of software instructions. While an example separation between user mode 202 and kernel mode 204 is described herein, it will be appreciated that other separations may be used (e.g., additional, alternative, or fewer, etc.) without departing from the spirit of this disclosure.

Similar to inspection point generation engine 114 in FIG. 1, inspection point generation engine 210 may generate one or more inspection points so as to cause exceptions to be generated during software execution. For example, inspection point generation engine 114 may alter API 218 and/or API 226 to incorporate an instruction that will generate an exception, including, but not limited to, a privileged instruction, a breakpoint instruction, or an invalid instruction. In some instances, API 218 and/or API 226 may further be altered to include an additional instruction that may be used as an index number or other identifier, such that user-mode threat processor 220 and/or kernel-mode threat processor 224 may determine which inspection point was reached and/or whether the inspection point was placed by inspection point generation engine 210, among other examples. As another example, inspection point generation engine 210 may set a process or hardware breakpoint at processor 206 that will generate an exception when reached. In other examples, inspection point generation engine 210 may remove execute, read, and/or write access to a page of memory in memory 208, such that an exception is thrown when application 216 or kernel module 222 accesses the page of memory. At least one of user-mode threat processor 220 and kernel-mode threat processor 224 may register one or more exception handlers accordingly, such that they may catch the thrown exception and process an associated context record as described herein. While example inspection points are described, it will be appreciated that any of a variety of other techniques may be used to induce an exception when a set of software instructions are executed.

Application 216 and kernel module 222 are provided as example software that may be executed by computing device 200. As described above, similar aspects disclosed herein may be applied to other sets of software instructions. As illustrated, application 216 may be executed in user mode 202. In an example, application 216 may execute on processor 206, call API 218 during execution, and access pages in memory 208. Similarly, kernel module 222 may execute in kernel mode 204 on processor 206, and may call API 226 and access memory 208. According to aspects disclosed herein, one or more inspection points may have been generated by inspection point generation engine 210 (e.g., on API 218, API 226, processor 206, memory 208, etc.).

In an example, user-mode threat processor 220 handles an exception resulting from an inspection point reached by application 216, such that a context record associated with the execution of application 216 is evaluated according to aspects described herein. In another example, user-mode threat processor 220 may perform any of a variety of corrective actions before application 216 resumes execution if a potential exploit is identified. While example operations are described herein as occurring prior to continued execution, it will be appreciated that at least some of the operations may alternatively or additionally be performed substantially contemporaneously with continued execution and/or after execution, among other examples. In some examples, user-mode threat processor 220 may subsequently call kernel-mode threat processor 224, such that at least a part of the operations and/or evaluations disclosed herein may be performed in kernel mode 204. In some examples, kernel-mode threat processor 224 may be used in order to provide increased security or to perform processing using resources that may be otherwise unavailable from user mode 202, among other reasons.

In other examples, kernel-mode threat processor 224 handles an exception resulting from an inspection point reached by kernel module 222, such that a context record associated with the execution of kernel module 222 is evaluated according to aspects described herein. In an example, kernel-mode threat processor 224 may perform any of a variety of corrective actions before kernel module 222 resumes execution if a potential exploit is identified. While example operations are described herein as occurring prior to continued execution, it will be appreciated that at least some of the operations may alternatively or additionally be performed substantially contemporaneously with continued execution and/or after execution, among other examples. In some examples, kernel-mode threat processor 224 may subsequently call user-mode threat processor 220, such that at least a part of the operations and/or evaluations disclosed herein may be performed in user mode 202. In some examples, user-mode threat processor 220 may be used because user-mode threat processor 220 may be more easily updated or maintained as a result of the potentially less stringent security restrictions that may be afforded by user mode 202.

Figure 3:
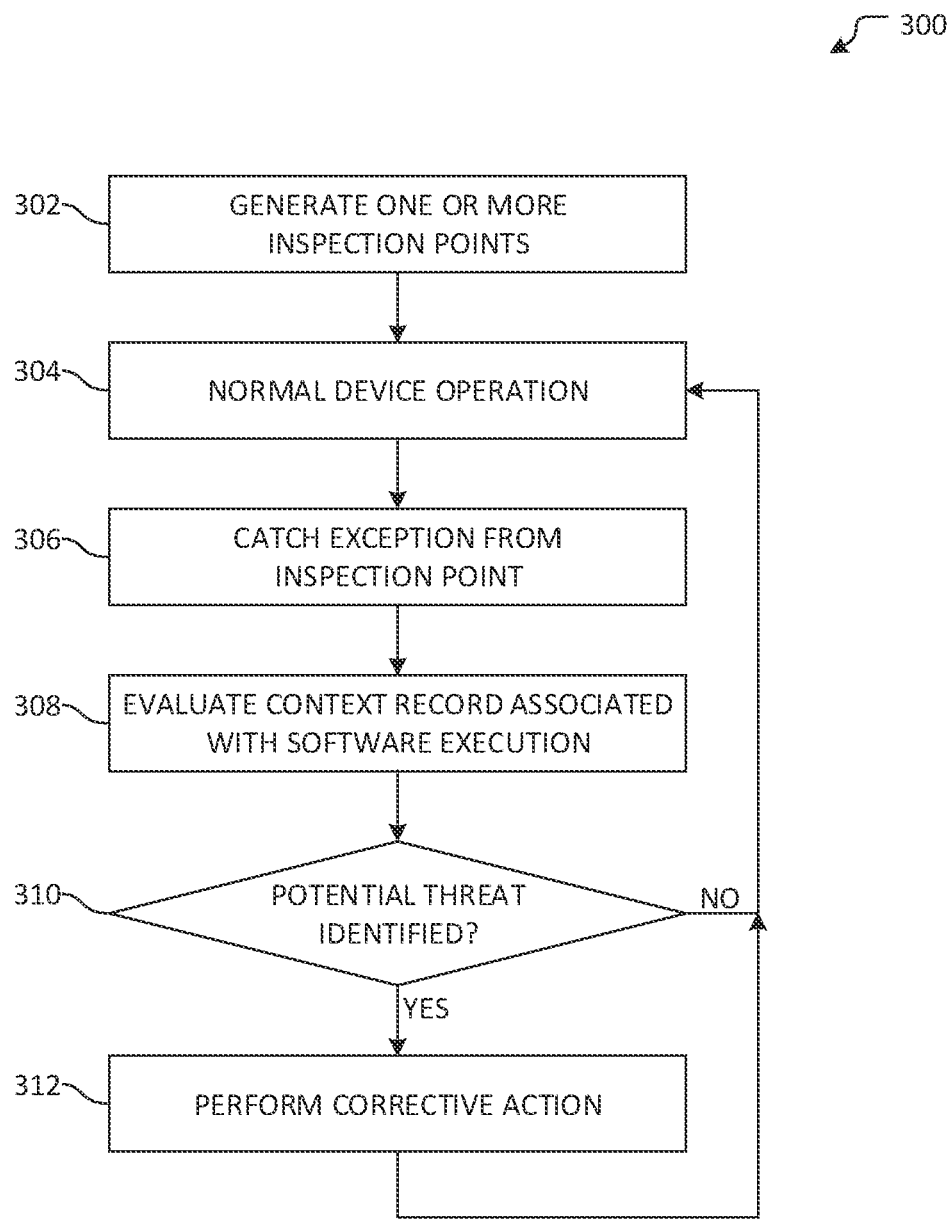
FIG. 3 illustrates an overview of an example method for exploit detection via induced exceptions.

FIG. 3 illustrates an overview of an example method 300 for exploit detection via induced exceptions. In an example, method 300 may be performed by a computing device, such as computing device 102 in FIG. 1 or computing device 200 in FIG. 2. Method 300 begins at operation 302, where one or more inspection points are generated. In an example, operation 302 may be performed by an inspection point generation engine, such as inspection point generation engine 114 in FIG. 1 or inspection point generation engine 210 in FIG. 2. As described above, an inspection point may be generated by altering aspects of one or more APIs, setting a process or hardware breakpoint, and/or modifying permissions of one or more memory pages, among other examples. One or more exception handlers corresponding to the generated inspection points may be registered, such that exceptions resulting from the generated inspection points may be caught and processed according to aspects described herein. While example inspection points are described, it will be appreciated that any of a variety of other techniques may be used to induce an exception when a set of software instructions are executed.

At operation 304, normal device operation may occur. As an example, normal device operation may comprise executing one or more sets of software instructions by the computing device (e.g., software instructions 108 in FIG. 1, or application 216 and/or kernel module 222 in FIG. 2). In some instances, a set of software instructions may be executed at the direction of a user or may be executed automatically, among other examples. During operation 304, a threat processor executing on the computing device may be idle or may perform any of a variety of corrective actions, including, but not limited to, post hoc analysis of gathered data or updating stored reputation information. In examples, during normal device operation, a set of software instructions may encounter an inspection point as was generated by operation 302.

Accordingly, method 300 progresses to operation 306, where an exception from an inspection point is caught. In an example, execution of the set of software instructions that threw the exception is suspended. In another example, a context record associated with the software execution is received, wherein the context record comprises a call stack and one or more register values associated with the execution of the set of software instructions, among other information.

At operation 308, the context record associated with the software execution is evaluated. As an example, one or more "slots" in a call stack of the context record may be evaluated. For instance, the slot preceding the stack pointer (e.g., four bytes prior to the stack pointer on a 32-bit system, etc.) may hold a target function address, while the next preceding slot (e.g., eight bytes prior to the stack pointer on a 32-bit system, etc.) may be evaluated to determine whether it contains a pointer to a return oriented programming (ROP) gadget. In such instances, it may be determined that ROP was used to arrive at the inspection point, based at least in part on the presence of the target function address and/or the pointer to the ROP gadget on the call stack. By contrast, when ROP is not present, such pointers would not be found in slots preceding the stack pointer, given that, during normal execution, the return address is pushed onto the stack and execution control is passed to the target function, such that a target function address and/or a ROP gadget pointer are not on the stack.

In another example, the return address is evaluated to determine whether it points to stack cleanup code that does not match or is dissimilar to what would otherwise be expected for the target function, especially if the code just prior to the return address contains a CALL instruction through a register that would normally never point to the target instruction. Such an evaluation may be used to identify a stack pivot exploit, among other examples. In some examples, one or more registers of the context record may be evaluated in addition to or as an alternative to the above evaluations. While example stack locations and registers are described herein, it will be appreciated any of a variety of other stack locations, registers, and other information from a context record may be evaluated in other examples. Accordingly, it is possible to determine whether the target function was entered by means of ROP and/or identify stack pivot exploits, among other exploits.

Flow progresses to determination 310, where it is determined whether a potential threat is identified based on the evaluation. In some examples, execution of the set of software instructions that threw the exception may be paused, while in other examples execution of the set of software instructions may be resumed, such that aspects described herein occur substantially contemporaneously with continued execution, among other examples.

If, at determination 310, it is determined that a potential threat is not identified, flow branches NO to operation 304, where normal device operation may continue. In some examples where execution was suspended, execution of the set of software instructions may resume. In some instances, the set of software instructions may be whitelisted, such that operation 308 is not performed when the set of software instructions reaches another inspection point (e.g., the same inspection point, any inspection point, etc.).

If, however, it is determined at determination 310 that a potential threat is identified, flow instead branches YES to operation 312, where a corrective action is performed. For example, an indication or prompt may be generated and presented (e.g., to a user, a system administrator, etc.), which may comprise a display of information associated with the potential threat (e.g., a threat type, a set of software instructions associated with the potential threat, education materials, etc.) and/or one or more suggested actions. In some examples, a selection of a suggested action may be received, such that the suggested action may be performed. In another example, an entry may be generated in a log and/or an indication may be provided to another component. In other examples, the corrective action may be taken automatically (e.g., terminating execution or adjusting execution parameters, access to one or more APIs, or access to memory, etc.) and/or data may be gathered for contemporaneous or later analysis. In an example, an indication may be received to whitelist or blacklist the set of software instructions. While example actions are described herein, it will be appreciated that other actions may alternatively or additionally be performed at operation 312.

Once the corrective action has been performed, flow progresses from operation 312 to operation 304, where normal device operation may continue. In some examples, flow may loop between operations 304, 306, 308, 310, and/or 312 while a computing device continues to operate (e.g., executing one or more sets of software instructions, receiving user input, etc.).

Figure 4:
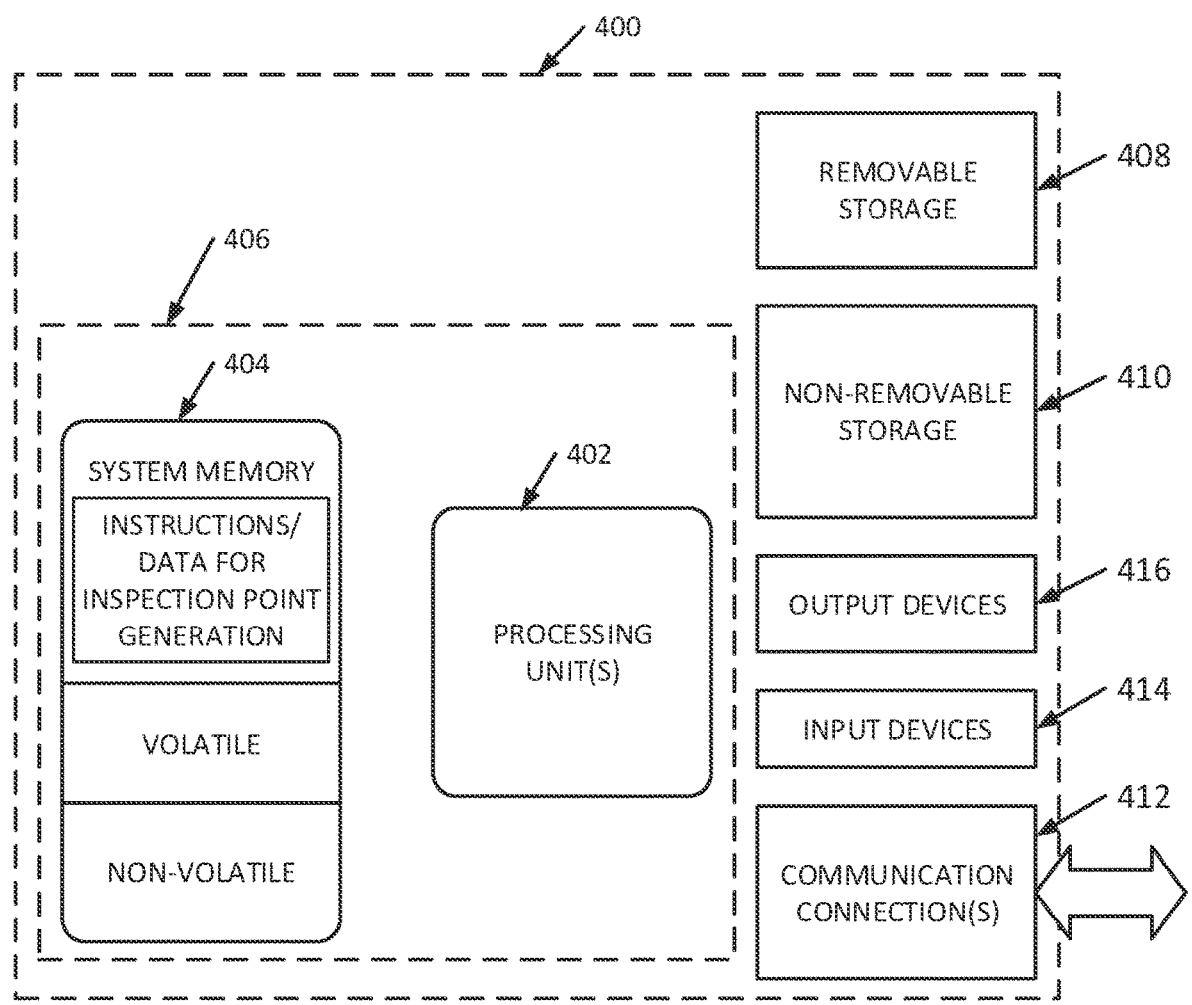
FIG. 4 illustrates one example of a suitable operating environment in which one or more aspects of the present embodiments may be implemented.

FIG. 4 illustrates one example of a suitable operating environment 400 in which one or more of the present embodiments may be implemented. This is only one example of a suitable operating environment and is not intended to suggest any limitation as to the scope of use or functionality. Other well-known computing systems, environments, and/or configurations that may be suitable for use include, but are not limited to, personal computers, server computers, hand-held or laptop devices, multiprocessor systems, microprocessor-based systems, programmable consumer electronics such as smart phones, network PCs, minicomputers, mainframe computers, distributed computing environments that include any of the above systems or devices, and the like.

In its most basic configuration, operating environment 400 typically includes at least one processing unit 402 and memory 404. Depending on the exact configuration and type of computing device, memory 404 (storing, among other things, one or more altered APIs, reputation information, a whitelist and/or blacklist, instructions to perform the methods disclosed herein, etc.) may be volatile (such as RAM), non-volatile (such as ROM, flash memory, etc.), or some combination of the two. This most basic configuration is illustrated in FIG. 4 by dashed line 406. Further, environment 400 may also include storage devices (removable, 408, and/or non-removable, 410) including, but not limited to, magnetic or optical disks or tape. Similarly, environment 400 may also have input device(s) 414 such as keyboard, mouse, pen, voice input, etc. and/or output device(s) 416 such as a display, speakers, printer, etc. Also included in the environment may be one or more communication connections, 412, such as LAN, WAN, point to point, etc.

Operating environment 400 typically includes at least some form of computer readable media. Computer readable media can be any available media that can be accessed by processing unit 402 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, non-transitory medium which can be used to store the desired information. Computer storage media does not include communication media.

Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The operating environment 400 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections may include any method supported by available communications media. Such networking environments are commonplace in offices, enterprise-wide computer networks, intranets and the Internet.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:
a processor; and
memory storing instructions that, when executed by the processor, causes the system to perform a set of operations, the set of operations comprising:
generating, by a threat processor, an inspection point, the inspection point causing an exception by a set of software instructions when the set of software instructions encounters the inspection point during execution by the at least one processor;
registering, by the threat processor, an exception handler to handle the exception caused by the inspection point;
receiving, in response to the set of software instructions encountering the inspection point, an indication of the exception comprising a context record;
evaluating the context record to determine if an exploit is present using reputation information, wherein the reputation information comprises:
a description of a threat; and
information relating to a corrective action; and
when it is determined that an exploit is present, performing at least one the corrective action for the exploit.

2. The system of claim 1, wherein generating the inspection point comprises altering an application programming interface to incorporate a first instruction that will generate the exception.

3. The system of claim 2, wherein the instructions executable by the processor comprise instructions for altering the application programming interface to incorporate a second instruction that comprises an identifier for the inspection point.

4. The system of claim 1, wherein generating the inspection point comprises setting a process breakpoint at the processor to generate the exception.

5. The system of claim 1, wherein generating the inspection point comprises setting a hardware breakpoint at the processor to generate the exception.

6. The system of claim 1, wherein generating the inspection point comprises altering a permission on a memory page to cause the exception to occur when the set of software instructions accesses the memory page.

7. The system of claim 1, wherein the context record comprises a recorded state of register values when the exception occurred and a call stack associated with the execution of the set of software instructions, and wherein evaluating the context record further comprises:
evaluating the call stack for a return on programming exploit; and
evaluating the call stack for a stack pivot exploit.

8. A method for exploit detection using an induced exception, comprising:
generating, by a threat processor, an inspection point, the inspection point causing an exception by a set of software instructions when the set of software instructions encounters the inspection point during execution by a processor;
registering, by the threat processor, an exception handler to handle the exception caused by the inspection point;
receiving, in response to the set of software instructions encountering the inspection point, an indication of the exception comprising a context record;
evaluating the context record to determine if an exploit is present using reputation information, wherein the reputation information comprises:
a description of a threat; and
information relating to a corrective action; and
when it is determined that an exploit is present, performing the corrective action for the exploit.

9. The method of claim 8, wherein generating the inspection point comprises altering an application programming interface to incorporate a first instruction that will generate the exception.

10. The method of claim 8, wherein generating the inspection point comprises setting a process breakpoint at the processor to generate the exception.

11. The method of claim 8, wherein generating the inspection point comprises setting a hardware breakpoint at the processor to generate the exception.

12. The method of claim 8, wherein generating the inspection point comprises altering a permission on a memory page to cause the exception to occur when the set of software instructions accesses the memory page.

13. The method of claim 8, wherein the context record comprises a recorded state of register values when the exception occurred and a call stack associated with the execution of the set of software instructions, and wherein evaluating the context record further comprises:
   evaluating the call stack for a return on programming exploit; and
   evaluating the call stack for a stack pivot exploit.

14. A computer program product comprising a non-transitory, computer-readable medium storing thereon a set of computer instructions executable by a processor for exploit detection, the set of computer instructions comprising instructions for:
   generating, by a threat processor, an inspection point, the inspection point causing an exception by a set of software instructions when the set of software instructions encounters the inspection point during execution by the at least one processor;
   registering, by the threat processor, an exception handler to handle the exception caused by the inspection point;
   receiving, in response to the set of software instructions encountering the inspection point, an indication of the exception comprising a context record;
   evaluating the context record to determine if an exploit is present using reputation information, wherein the reputation information comprises:
   a description of a threat; and
   information relating to a corrective action; and
   when it is determined that an exploit is present, performing the corrective action for the exploit.

15. The computer program product of claim 14, wherein generating the inspection point comprises altering an application programming interface to incorporate a first instruction that will generate the exception.

16. The computer program product of claim 14, wherein generating the inspection point comprises setting a process breakpoint at the processor to generate the exception.

17. The computer program product of claim 14, wherein generating the inspection point comprises setting a hardware breakpoint at the processor to generate the exception.

18. The computer program product of claim 14, wherein generating the inspection point comprises altering a permission on a memory page to cause the exception to occur when the set of software instructions accesses the memory page.

* * * * *